United States Patent [19]

McCartney

[11] 4,414,431
[45] Nov. 8, 1983

[54] METHOD AND APPARATUS FOR DISPLAYING SPEECH INFORMATION

[75] Inventor: Michael L. McCartney, Durham, N.C.

[73] Assignee: Research Triangle Institute, Research Triangle Park, N.C.

[21] Appl. No.: 198,068

[22] Filed: Oct. 17, 1980

[51] Int. Cl.³ ............................ G10L 1/00; G02B 17/00
[52] U.S. Cl. ......................................... 381/48; 351/50; 351/47
[58] Field of Search .......................... 179/1 SP, 107 S; 84/464 R; 351/13, 15, 50, 47

[56] References Cited

U.S. PATENT DOCUMENTS

| | | | |
|---|---|---|---|
| 3,463,885 | 8/1969 | Upton | 179/1 SP |
| 3,818,137 | 6/1974 | Kage | 179/1 SP |
| 3,936,605 | 2/1976 | Upton | 179/1 SP |
| 4,117,265 | 9/1978 | Gerlach | 179/1 SP |

*Primary Examiner*—Emanuel S. Kemeny
*Attorney, Agent, or Firm*—Cushman, Darby & Cushman

[57] ABSTRACT

A device for producing images of a plurality of speech information symbols associated with speech sounds produced by a speaker into the field of view of a hearing-impaired person with one or more light emitting or illuminated arrays mounted paraxially with the viewer's line of sight on a transparent plate which subtends and mounts an adjacent eyeglass lens. A mirror is mounted on the lens to produce a magnified image in the field of view and reflect the image back to the viewer. The interior surface of the lens may be coated to form the mirror or spherical dimples may be ground into the surface before coating and the coated dimples then filled with a material having substantially the same refractive index as the lens.

11 Claims, 8 Drawing Figures

FIG. 1
FIG. 2
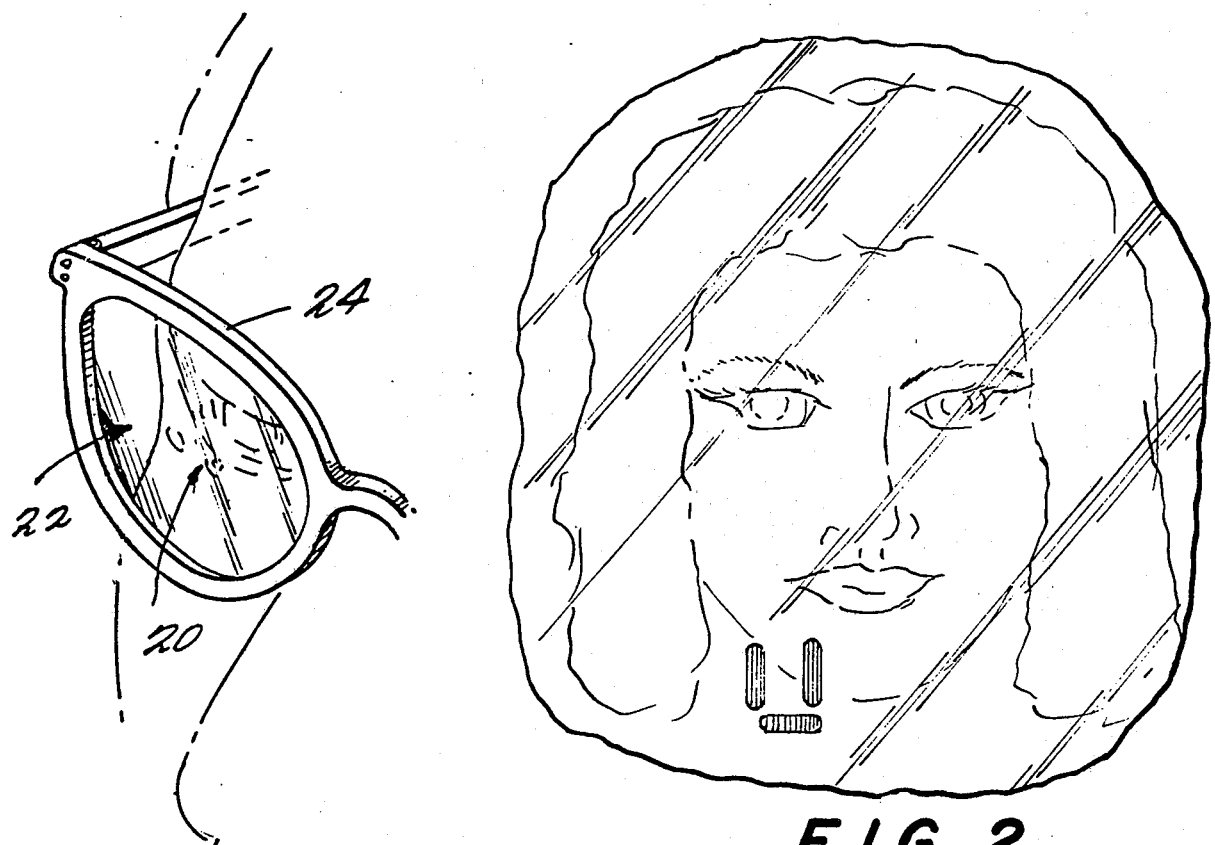
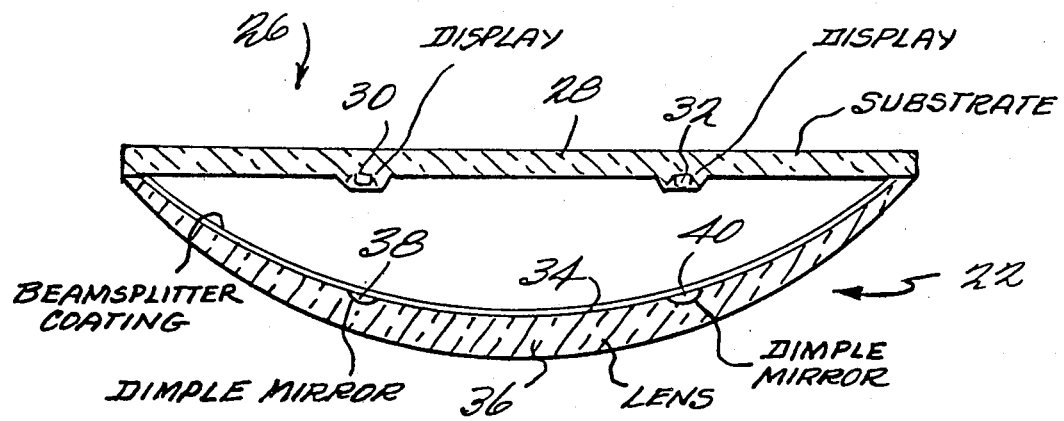
FIG. 4A

METHOD AND APPARATUS FOR DISPLAYING SPEECH INFORMATION

BACKGROUND AND SUMMARY OF THE INVENTION

The present invention relates to a device for producing an image of speech information, particularly a symbol indicating one of a plurality of groups of detected sounds, and producing that image in the field of view of a hearing impaired wearer of the device.

Innumerable situations exist in which it is desirable to supply information to an individual by superimposing an image onto his normal field of vision. One example where such a display is needed is for the production of symbols indicating one of a plurality of detected groups of sounds onto the field of vision of a deaf or hearing impaired person.

Communication in any spoken language is made up of sequences of sounds which are called phonemes. By observation of the movements of the lips of a speaking person, a hearing impaired of deaf person can discern that each sound is one of a limited number of possible phonemes. Unfortunately, however, the ambiguities for a totally deaf person are too great for effective communication to take place using only lipreading.

If a person has some aid in resolving ambiguities, for example, understanding of an additional 10-20% of phonemes in addition to those understood by lipreading alone, then enough of the information in the speech can be understood by a trained lipreader for effective transfer of information. Often a lipreader will have limited hearing sufficient for this purpose. Alternatively, manual curing, a technique developed by Orin Cornett of Gallaudet College, utilizes hand cues to remove sufficient ambiguities to make lipreading practical. The difficulty with manually cued speech, of course, is that it can be used only with those individuals who have been trained to use it, thus limiting severely the number of people whom a deaf person can understand.

The different sounds of any language have different waveform characteristics which permit limited differentiation into different groups of sounds. These basic analyzing techniques are old and are described, for example, in pages 139-148, J. L. Flanagan, *Speech Analysis, Synthesis and Perception*, Academic Press, 1965. Using these analytic techniques, signals can be produced from detected spoken sounds, each signal indicating one of a plurality of different sound groups. The sounds in each group are differentiable on the lip so that, if this information can be effectively communicated to the lipreader, sufficient ambiguities can be removed to permit effective lipreading.

One way to communicate sufficient information to a lipreader to make lipreading truly effective is to superimpose a symbol identifying a sound group upon the viewer's field of vision which he can see as he watches a speaker's lips. This basic technique is described in two patents to Upton U.S. Pat. Nos. 3,463,885 and 3,936,605. In both of these patents a display is disclosed which is mounted upon a pair of spectacles intended to be worn by the hearing impaired or deaf person. In the system described in Upton U.S. Pat. No. 3,463,885, three types of sounds are detected—fricative, plosive and voiced. A number of bulbs are mounted on a lens of the spectacles, and each associated with one of these types of sounds. The associated bulb is activated when that type of sound is detected. In one embodiment, sounds which are a combination of these different types of sounds activate more than one bulb. In another embodiment, separate bulbs are utilized to denote combinations.

In Upton U.S. Pat. No. 3,936,605, a device is described in which the source of the image is mounted on the eyeglass frame at the side of the eye of the wearer and outside his field of vision. The eyeglass lens supports a generally spherical mirror which is positioned with respect to the eye so that the information source at the side of the eye is reflected by the mirror to project an image into the field of view.

The present invention is a unique display system which finds particular utility in projecting symbols into the field of view of a person for use in resolving the ambiguities of lipreading. According to the present invention, the display including a lamp array is mounted paraxially with the viewer's line of sight and directly in the field of view on a transparent plate which subtends and mounts an eyeglass lens. Light from the array is projected forwardly of the eyeglass wearer and reflected back to the wearer by either a semi-transparent mirror coating on the lens, or by magnifying dimple mirrors in the lens. The mirror coating can be formed by a coating of a reflecting material such as silver or aluminum, or multiple layers of dielectric material. For some people, the internal surface of their prescription lenses can be ground to a sufficiently short radius to project a suitably magnified image. Alternatively, short radius, spherical dimples facing the display can be ground into the internal surface before coating. After coating to form the mirror, the dimples can then be filled with material having the same optical characteristics as the lens thus removing the refractive power of the dimples. A high-magnification mirror operating as a beam-splitter permits mounting the display itself in the field of view since the amount of light that the display blocks from the eye is too small to substantially interfere with vision.

Preferably, the display is an array which can provide any of a number of symbols. One of the difficulties with the system of Upton is that each of its indications is that of a single phoneme, and, at normal rates of speaking, the sounds occur so quickly that it is doubtful that they can be effectively used at that rate by the brain. According to the present invention, this problem is reduced by displaying information as syllables, i.e., normally a combination of a consonant sound and a vowel sound, although occasionally a single phoneme can be a syllable. This concept is described in detail and claimed in a co-pending application Ser. No. 198,211 filed even date herewith, and entitled "Method and Apparatus For Automatic Curing", the disclosure of which is hereby incorporated by reference. One way that syllable information can be displayed is with a symbol indicating one of a plurality of consonant groups in a mode indicating an associated vowel group. For example, a symbol indicating one of nine consonant groups can be produced in one of four spatial locations, i.e., quadrants, the spatial location indicating the associated vowel group. Another approach is to produce the symbol in one of a number of colors, for example, four, each color indicating an associated vowel group. The present device facilitates display of syllable symbols and the effective communication of information to the lipreader.

Other objects and purposes of the invention will be clear from the following detailed description of the drawings.

BRIEF DESCRIPTION OF THE DRAWINGS

FIG. 1 shows a perspective view of the device of the present invention mounted on an eyeglass frame;

FIG. 2 shows a view of one of the symbols of the present invention superimposed upon an image in the field of view;

FIGS. 4A and 4B show a schematic view of one embodiment of the display of the present invention mounted on a spectacle lens;

DETAILED DESCRIPTION OF THE DRAWINGS

Figure 3:
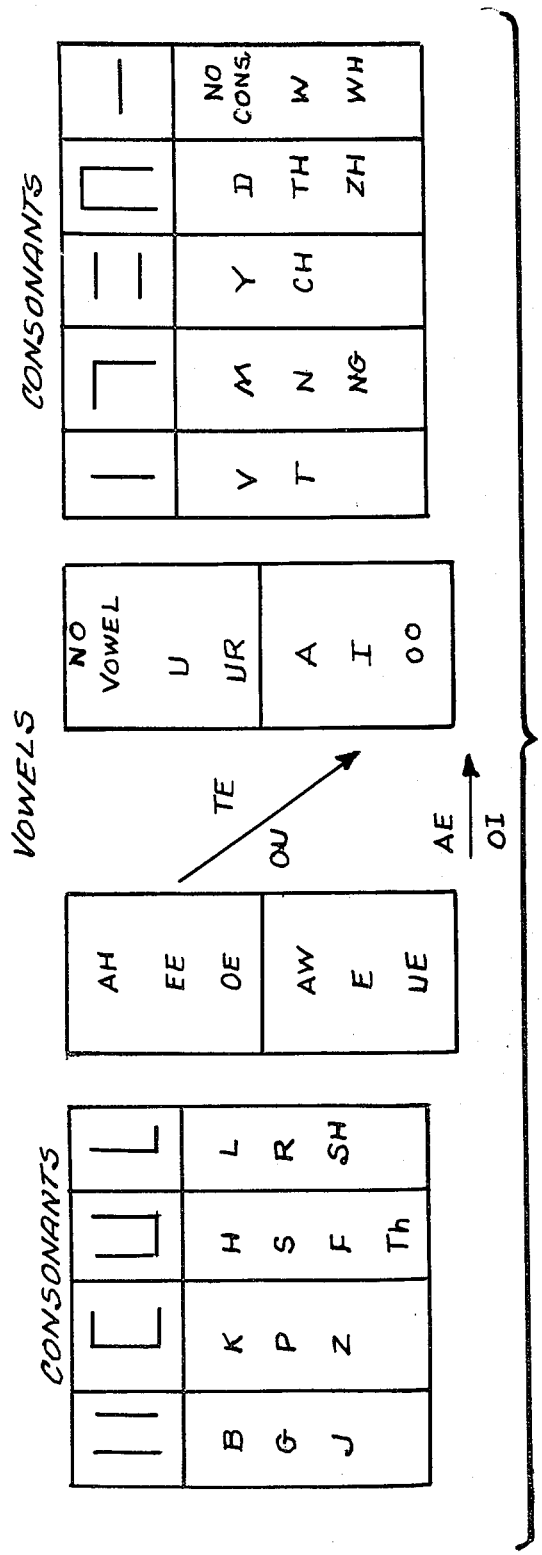
FIG. 3 shows a diagram of the consonant and vowel groups.

Reference is now made to FIGS. 1 and 2 which show a schematic view of the display 20 of the present invention mounted on a conventional prescription lens 22 which is in turn mounted within a conventional eyeglass frame 24 and producing a symbol superimposed on the field of view. As discussed in detail below, display 20 produces an image of one of a number of different symbols, each symbol being associated with one of a number of groups of consonants as shown in FIG. 3, and produced in a mode identifying a group to which an associated vowel is assigned. For example, each symbol can be produced in one of four quadrants, each quadrant being associated with a different group of vowels, the combination of the consonant symbol and its location defining a syllable. Alternatively, the color of the symbol can indicate the vowel group by activating one or more displays of different colors or controlling a conventional multi-color display. Techniques for producing single color symbols are described in the above-mentioned patent application and book and in detail in the reports entitled "A Feasibility Study for the Development of a Speech Autocuer" (NASA Contract Number NAS5-2554).

FIG. 3 illustrates one possible set of groupings of consonants and vowels and the associated consonant symbols and vowel locations or other modes of presentation. With the exception of the group of consonants containing "n" and "ng", the consonants of each group can be readily differentiated by a lip-reader from each of the other consonants of that group from observation of the speaker's mouth alone. The single exception causes minimal linguistic confusion in English because discrimination between "n" and "ng" is rarely required for understanding. Some syllables have no vowels and rapidly spoken syllables often have a vowel which may not be detected. The detected absence of a vowel is treated as a component of one vowel group. Absence of a consonant is treated similarly. Diphthongs are handled by movement of the symbol from one quadrant position to another, based upon the vowel components of the diphthong as schematically shown in FIG. 3.

Figure 4B:
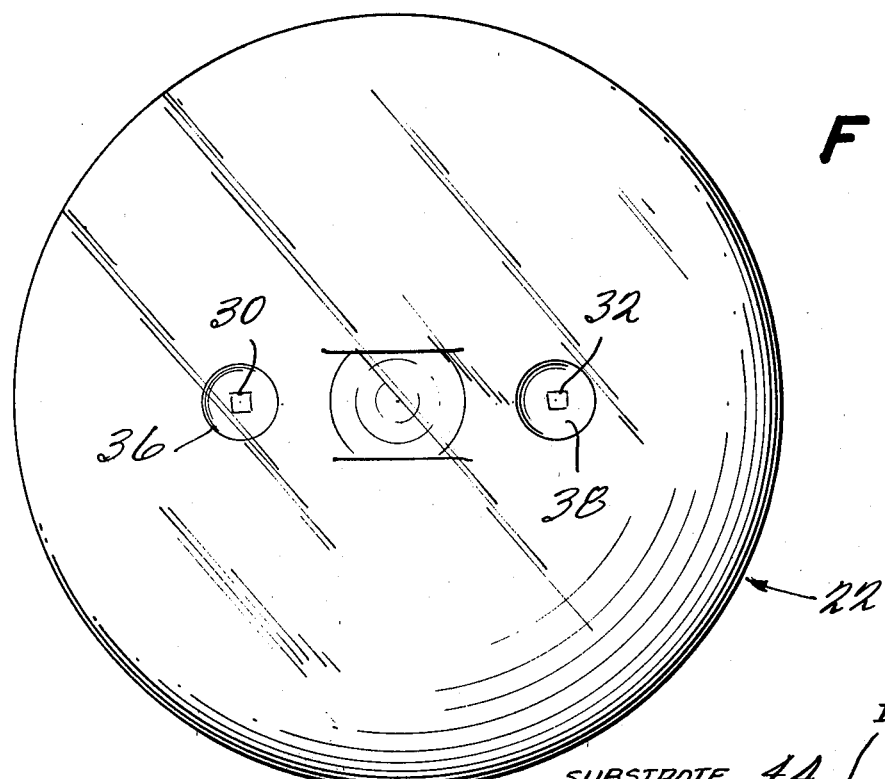

Reference is now made to FIGS. 4A and 4B which illustrate a first embodiment of the present invention. In this embodiment, display 20 is made up of two light emitting arrays, 30 and 32, and structure defining a beamsplitter associated with each of the respective arrays. In the embodiment of FIG. 4, the beamsplitter is formed by a coating 34 of silver, aluminum or other reflective material coated onto the interior surface of a conventional prescription lens 36 of glass or suitable plastic. Arrays 30 and 32 are mounted upon a transparent substrate 28 by any suitable means, and the substrate 28 in turn fixed at its extremities to prescription lens 36 by any suitable means.

Lens 36 is selected for optical correction where necessary. Next, spherical dimples 38 and 40 are ground on the inner surface of lens 36 to a radius suitable to provide the desired magnification. The interior surface of lens 36 is next optically coated with coating 34, for example, by deposition in a vacuum. The dimples are then back filled with material having the same, or virtually the same index of refraction as the material of lens 38. The material filling dimples 38 and 40 may be the same material as the lens 36.

Figure 5:
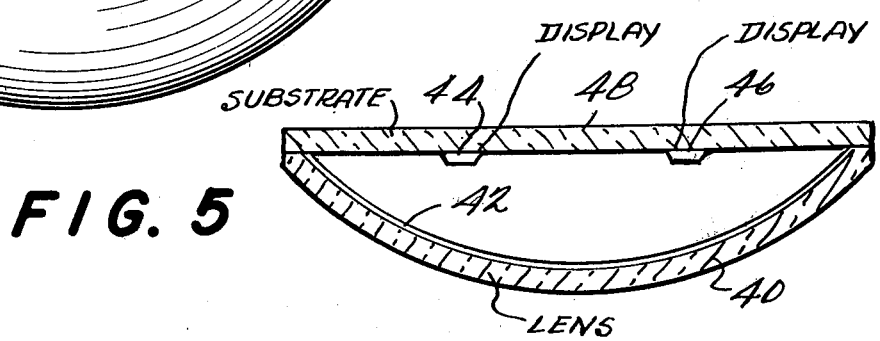
FIG. 5 shows a second embodiment of the present invention.

FIG. 5 illustrates a second embodiment in which the interior surface of lens 40 is curved at a short enough radius to project a suitably magnified symbol image. A thin coating 42 serves as the beamsplitting mirror and can be formed as described above. Displays 44 and 46 are mounted on transparent substrate 48 which is fixed to lens 40 in any suitable fashion.

Figure 6:
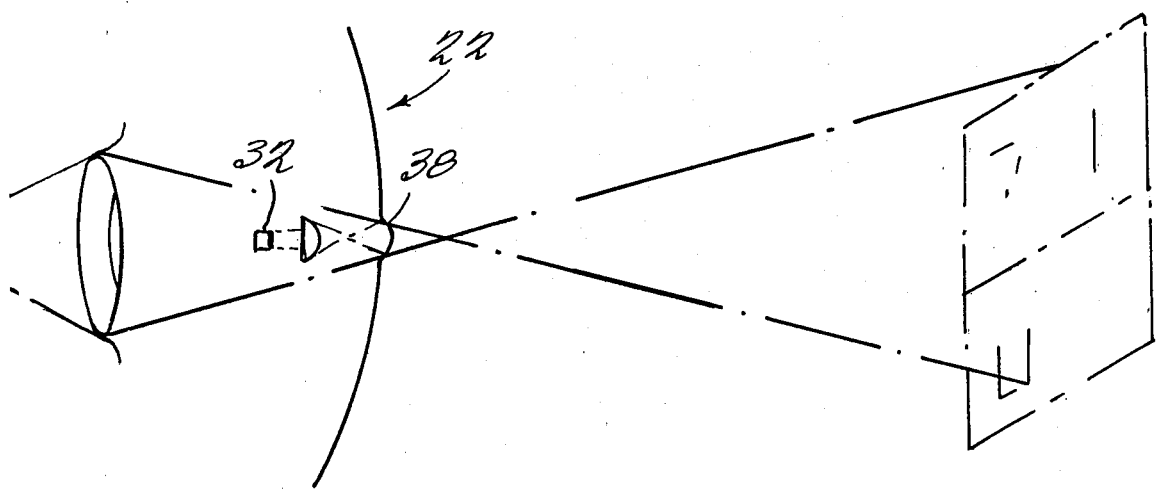
FIG. 6 shows a schematic view of the present invention projecting an image onto the field of view of a lipreader.

Either the top portion of the lower portion of one display, i.e., a light emitting diode (LED) array 30 and 32 is actuated in the embodiments of both FIGS. 4 and 5 to produce a symbol by the associated mirror to one of the four quadrants as shown schematically in FIG. 6. In other words, each symbol is produced in an upper or lower spatial location depending on whether the upper or lower portion of the display is activated.

The embodiment of FIGS. 4 and 5 produces a symbol indicating a group of consonants, for example, as shown in FIG. 2 to a quadrant indicating the group to which an associated vowel belongs. Alternatively, the color of the symbol can indicate the vowel group.

The contrast between the magnified image and the normal visual field may be increased by any one or a combination of methods. A neutral-density material may be used for the mirror substrate to reduce normal visual field brightness. Tinted material can alternatively be used for the substrate to provide an absorption maximum near the wavelength of display emission or illumination. A wavelength-selective mirror coating such as a multi-layer dielectric having a reflectivity peak near the wavelength of the display emission or illumination can be employed.

Figure 7:
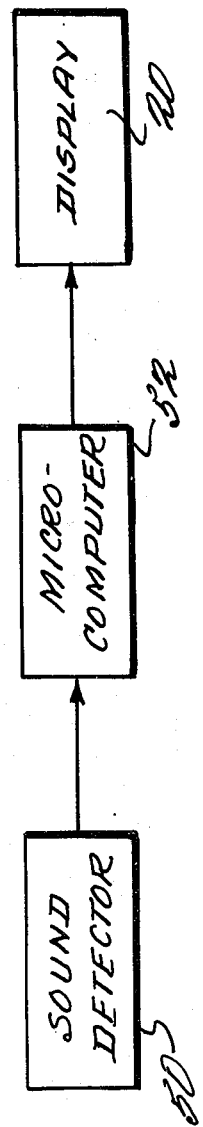
FIG. 7 shows a block diagram of an apparatus for producing signals to actuate the display.

FIG. 7 shows schematically the apparatus for detecting the speech sounds and producing the signals for actuating display 20. A conventional detector 50 receives the speech sounds and produces an electrical signal having characteristics uniquely associated with each sound. These signals are applied to the microcomputer 52 which produces the signals to activate display 20. These elements are described in detail in the above-mentioned co-pending application and may be mounted on frame 24 adjacent the lens.

Many changes and modifications in the above-described embodiment of the invention can, of course, be made without departing from the scope of that invention. Accordingly, the scope is intended to be limited only by the appended claims.

What is claimed is:

1. A wearable display system for producing a virtual image for viewing by a person comprising:

a pair of spectacles adapted to be worn by the person and having at least one lens;

a transparent plate which supports and subtends said lens;

at least one lamp array mounted paraxially with the viewer's line of sight on said plate for producing one of a plurality of images each indicating a group of speech sounds and projecting said one image forward of the viewer; and at least one light transmitting mirror mounted adjacent said lamp array on said lens for reflecting said one image back to the viewer.

2. A device as in claim 1, wherein said mirror includes a coating on the interior surface of said lens for reflecting a portion of the light incident thereon.

3. A wearable device for producing an image of a plurality of speech information symbols associated with speech sounds produced by a speaker in the field of view of a hearing impaired viewer of said speaker comprising:

display means including at least one lamp array for producing an image of said symbol; and light transmitting means including a lens, a transparent plate fixed to and supporting said lens so as to subtend said lens and mounting said display means on a surface thereof paraxially with the viewer's line of sight, said lens having a spherical dimple and transparent material filling said dimple and having substantially the same index of refraction as said lens, said material defining a mirror facing said display means for reflecting said image back to the viewer, and frame means for mounting said lens and plate in front of the eye of said viewer so that said image is magnified by said mirror to appear in said field of view as a magnified image to aid said viewer in identifying speech sounds.

4. A device as in claim 1, wherein said lens is a prescription lens.

5. A device as in claim 1, wherein said lens has a radius of curvature on said interior surface to project a magnified image into said field of view.

6. A device as in claim 1, wherein said lens incorporates material to transmit light from said field of view so as to enhance the contrast between said image and said field of view.

7. A device as in claim 1, further including means for detecting speech sounds and producing an electrical signal having characteristics uniquely associated with each sound, and computer means for receiving said electrical signal and activating said lamp array.

8. A device as in claim 1, including first and second light emitting arrays mounted adjacent to each other for projecting said image to one of a plurality of spatial locations.

9. A display system as in claim 1, wherein said mirror is backfilled with material having the same index of refraction as said spectacles.

10. A device as in claim 1 wherein said device includes means for detecting sounds and actuating said display in accordance therewith.

11. A device as in claim 10, further including a frame for mounting said device in a pair of spectacles to be worn by the viewer.

* * * * *

UNITED STATES PATENT AND TRADEMARK OFFICE
CERTIFICATE OF CORRECTION

PATENT NO. : 4,414,431

DATED : November 8, 1983

INVENTOR(S) : McCartney

It is certified that error appears in the above-identified patent and that said Letters Patent is hereby corrected as shown below:

Column 1, line 22, delete "of" and insert --or--;
         line 34, delete "curing and insert --cuing--.

Column 2, line 53, delete "curing" and insert --cuing--.

Signed and Sealed this

Twenty-second Day of January 1985

[SEAL]

Attest:

DONALD J. QUIGG

Attesting Officer     Acting Commissioner of Patents and Trademarks